United States Patent [19]
Reed et al.

[11] Patent Number: 6,134,226
[45] Date of Patent: Oct. 17, 2000

[54] METHOD AND SYSTEM FOR ALLOCATING A SYSTEM RESOURCE TO SUBSCRIBERS OF A WIRELESS COMMUNICATIONS SYSTEM

[75] Inventors: John Douglas Reed, Arlington; Jack Anthony Smith, Bedford, both of Tex.

[73] Assignee: Motorola, Inc., Schaumburg, Ill.

[21] Appl. No.: 09/224,500

[22] Filed: Dec. 31, 1998

[51] Int. Cl.<sup>7</sup> ...................................................... H04J 1/00
[52] U.S. Cl. ............................................ 370/328; 455/450
[58] Field of Search ..................................... 370/328, 329, 370/330, 331, 332, 341, 347, 348, 431, 442, 468, 343; 455/422, 436–442, 464, 450, 452

[56] References Cited

U.S. PATENT DOCUMENTS

| | | | |
|---|---|---|---|
| 5,548,808 | 8/1996 | Bruckert et al. | 455/422 |
| 5,831,976 | 11/1998 | Lin et al. | 370/329 |
| 5,898,730 | 4/1999 | Hensley et al. | 375/224 |
| 6,002,677 | 12/1999 | Javitt et al. | 370/329 |

*Primary Examiner*—Ajit Patel
*Attorney, Agent, or Firm*—L. Bruce Terry

[57] ABSTRACT

In a method for allocating a system resource to subscribers of a wireless communication system a resource sensitivity indicator is determined for a system resource allocated by the wireless communication system for each of a first subscriber and a second subscriber. The system resource may include a level of service, a channel frequency, or a data rate. Next, an inefficient allocation of the system resource detected. One of the first and second subscribers having a lower resource sensitivity indicator is selected. Finally, an allocation of the system resource is changed for the selected subscriber unit to increase the efficiency of the allocation of the system resource.

17 Claims, 4 Drawing Sheets

METHOD AND SYSTEM FOR ALLOCATING A SYSTEM RESOURCE TO SUBSCRIBERS OF A WIRELESS COMMUNICATIONS SYSTEM

FIELD OF THE INVENTION

The present invention is related in general to wireless communications systems, and more particularly to an improved method and system for allocating a system resource to subscribers of a wireless communication system.

BACKGROUND OF THE INVENTION

In a wireless communications system, system resources are allocated to subscribers of the wireless communication system. These system resources may include a variety of system assets, such as a channel having a selected transmission frequency, a data transmission rate, a level of service or data transmission quality, a transmission power, or other similar system resources. As more subscribers are served by the communications system, or as the subscribers demand better or more sophisticated services, these system resources allocated by the communication system may be depleted, which may cause some subscribers to have a reduced level of service, or in some cases to go without service at all.

A system resource may be thought of as a finite quantity or a quality of something or some service that the communications system may allocate to one subscriber at the expense or exclusion of another subscriber. For example, the communication system does not have an unlimited number of channels or an unlimited number of frequencies for such channels. Thus, a channel, which may be defined as a means of separating one subscriber's information from another subscriber's information, is a system resource that is allocated to a subscriber when the communication of information with the subscriber is desired. Once the supply is depleted by allocation to a number of subscribers, additional subscribers cannot receive an allocation until some of the system resource is relinquished.

If a system resource is in short supply, but not completely depleted by allocation, allocation of the system resource to one subscriber may cost or otherwise affect another subscriber who will not be allocated a desired level of a requested system resource. Thus, in some instances, subscribers are not excluded from service, but they are asked to operate with a less than requested amount of a system resource.

Several system resources may be collectively allocated when a service is requested. For example, when a channel is allocated the several system resources that may be allocated include: a transmission frequency; a time slot; a user code, such as a spreading code; and the like. This list demonstrates that system resources may be revealed by examining system parameters that are set in order to facilitate communication or services provided to the subscriber unit.

Because system resources are limited, and because the allocation of a system resource to one subscriber may affect another, decisions about allocating a system resource must be made when system resources are depleted, or when the system cannot satisfy all requests for system resources. System resource allocation decisions may also be made in order to conserve system resources and increase the efficiency of the communications system. These increases in efficiency may lower the power used by the communications system, or otherwise increase the overall capacity of the communications system to serve the subscribers.

In the past, allocation of system resources has typically been made on a first-come-first-served basis. This type of rule is not always the fairest way to allocate resources, nor will it always be the most efficient way. Thus, a need exist in a wireless communication system for an improved method and system for allocating system resources to subscribers that attempts to harmonize the needs of a single subscriber with the needs of the other subscribers sharing the system resources.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
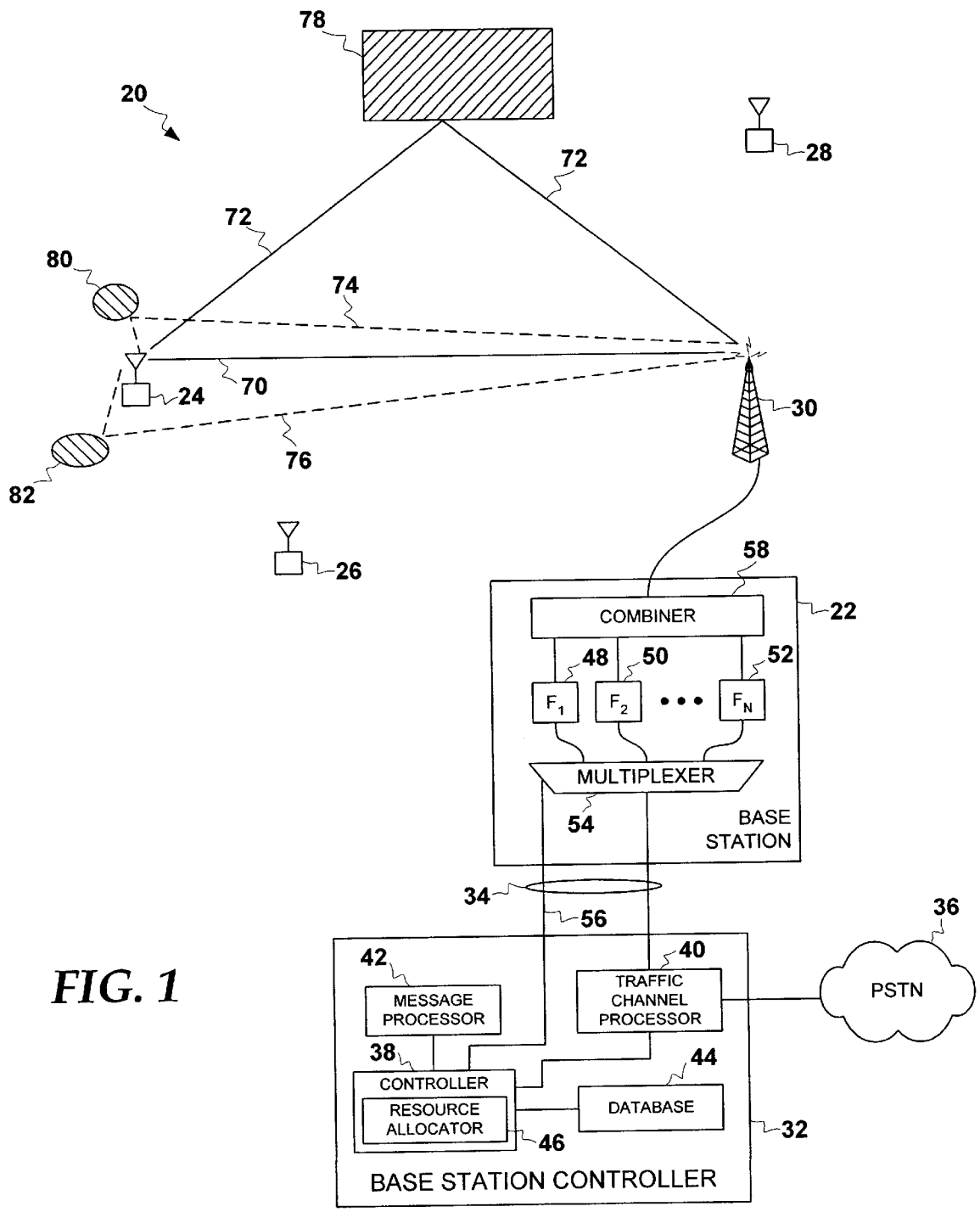
FIG. 1 depicts a high-level schematic diagram of a wireless communication system that may be used to implement the method and system of the present invention.

With reference now to the figures, and in particular with reference to FIG. 1, there is depicted a wireless communication system 20 that includes base station 22 that communicates with wireless subscriber unit 24. Other subscriber units 26 and 28 may also be served by base station 22. Base station 22 is coupled to antenna 30 for transmitting and receiving radio frequency signals with subscriber units 24–28.

Base station controller 32 is coupled to base station 22 for controlling the operation of base station 22 and for communicating traffic channel data to and from base station 22. Base station controller 32 and base station 22 are connected by a backhaul 34, which may be implemented via a T1, or other standard communication link. Base station controller 32 may also be connected to public switched telephone network (PSTN) 36 so that subscriber units may communicate with other devices connected to the PSTN.

Base station controller 32 also includes controller 38, which may be implemented with a general purpose data processor in order to control the functions within base station controller 32. Controller 38 is coupled to traffic channel processor 40, message processor 42, and database 44.

Traffic channel processor 40 processes voice and other data that is communicated between subscriber units 24–28, or between PSTN 36 and subscriber units 24–28. This processing may involve translating voice and other data between a PSTN format and an air interface format. Air interfaces that may be used in communications system 20 include frequency division multiple access (FDMA), time division multiple access (TDMA), code division multiple access (CDMA), and other similar air interface standards.

Message processor 42 handles the communication of control messages between base station controller 32 and base station 22, wherein some of such messages are further communicated with subscriber units 24–28. The message processing function involves parsing and interpreting incoming messages and formatting outgoing messages.

Database 44 stores and organizes data that represents the state and current operating parameters of communication system 20. Data stored in database 44 may include current allocations of system resources, thresholds that govern the allocation of system resources, current requests for allocation of system resources, and the like.

Also shown within controller 38 is resource allocator 46 which is responsible for making decisions regarding the allocation of system resources to subscriber units 24–28. Allocation of system resources is described in greater detail with reference to FIGS. 3 and 4 below.

Base station 22 is shown with several radio frequency power amplifiers 48–52 which amplify signals on frequencies $F_1$–$F_n$, respectively. These frequencies represent a system resource, multiple carrier frequencies, which may be allocated to a subscriber unit.

Multiplexer 54 receives traffic channel data from traffic channel processor 44 and routes such data to one of the power amplifiers 48–52 according to control signal 56. Control signal 56 represents an allocation decision made by resource allocator 46 to place traffic channel data on a particular frequency for a particular subscriber.

Combiner 58 receives amplified radio frequency signals from power amplifiers 48–52 and combines these signals in a manner suitable for transmission from antenna 30. Combiner 58 may be implemented with a known hybrid or cavity combiner using frequency selective elements to minimize combining losses.

One of the operating principles of the present invention is derived from the fact that some system resources are not fungible—that is, they cannot be interchanged with no cost or effect on the subscriber unit. For example, in communication system 20, one of the system resources allocated to subscriber units 24–28 is a downlink transmission frequency. In order to describe why subscriber unit 24 may prefer one downlink transmission frequency over another, various radio frequency propagation paths 70–76 are shown between antenna 30 and subscriber unit 24. Some of these paths are reflected or diffracted by objects 78–82. Object 78 may be a building which causes a reflection in propagation path 72. Objects 80 and 82 are much closer to subscriber unit 24 than object 78, and therefore the reflections in paths 74 and 76 do not substantially lengthen those paths. Path 70 is a direct path, and is therefore the shortest path between antenna 30 and subscriber unit 24. Signals along path 70 arrive before signals traveling paths 72–76.

A number of amplitudes may be produced as numerous rays traveling paths 70–76 add vectorially at the antenna of subscriber unit 24. In some cases, at a particular frequency, the vector addition of rays, each having its own amplitude and phase, will produce a null, or fade. However, when a signal is faded on one frequency, it is likely that it will not be faded on another frequency that is different, or spaced apart, by more than a certain percentage. This may mean that a channel on $F_1$ may be faded while another channel on $F_2$ is not. The rate that fades change with changes in frequency is related to the differential path length between different signal paths. This effect is known as "frequency selective fading."

Thus, downlink transmit frequency is a system resource that is allocated to a subscriber unit, and a system resource for which the subscriber unit may have a preference. Furthermore, the preference may be quantifiable in that the choice of one frequency over another may have a measurable impact on the performance of the subscriber unit, and the performance of the communications system. The presence or magnitude of a preference for one system resource allocation over another may be expressed as a "resource sensitivity indicator."

The resource sensitivity indicator informs the communications system that the subscriber cares about the allocation of the system resource, and it may further indicate the relative importance of one allocation of system resource over another, from the perception of the subscriber unit. Where a prior art communications system may assume that the allocation of one system resource would be as acceptable to the subscriber unit as another, the resource sensitivity indicator may be used to indicate whether, or how much the subscriber prefers the allocation of one resource over another.

If subscribers have a statistically random variation of preferences for allocation of a system resource wherein approximately the same number of subscribers prefer one resource as another resource, allocation of a preferred resource to each subscriber, rather than a random or first-come-first-served allocation, may increase the efficiency of the whole communications system while satisfying all requests for allocation of system resources.

If available system resources cannot be allocated to meet all requests, deciding which subscribers will not have allocation requests granted can be made with consideration of the resource sensitivity indicators of the subscriber units.

While the description below describes allocating a downlink frequency to subscriber units, it should be noted that the present invention may be used to allocate many other system resources in a similar manner according to the principles of the present invention.

Note that a preference for a downlink frequency may be a more useful concept with regard to a subscriber unit that is fixed or relatively immobile such that the radio propagation paths are fixed or slowly changing compared to faster moving mobile units. Such subscriber units may be referred to as "fixed wireless terminals." The preference for allocations of other system resources, such as a data rate, may not be as sensitive to the mobility of the subscriber unit.

Figure 2:
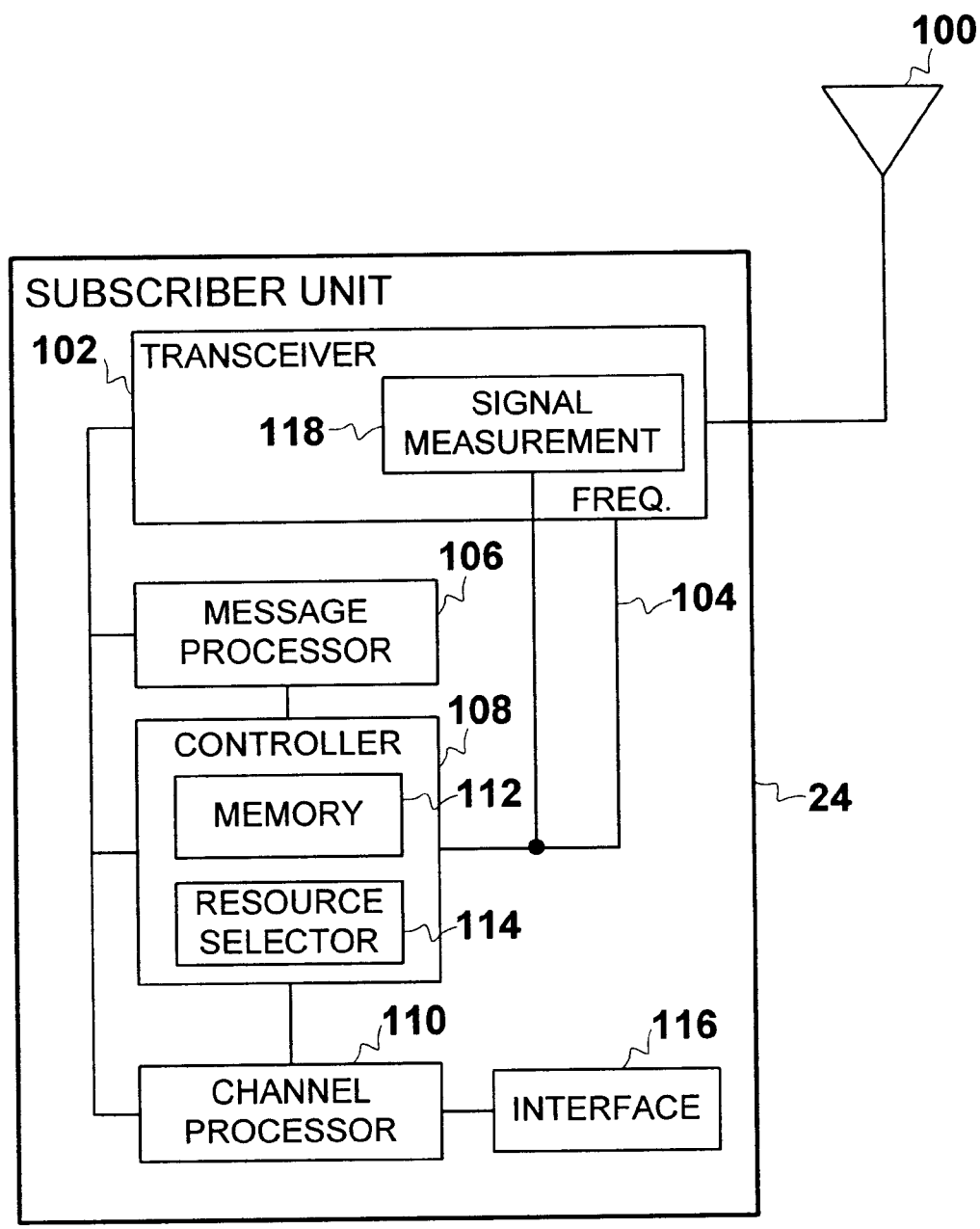
FIG. 2 is a high-level schematic diagram of a subscriber unit which may be used in the communications system shown in FIG. 1, in accordance with the method and system of the present invention.

Referring now to FIG. 2, there is depicted a subscriber unit, such as subscriber units 24–28 of FIG. 1, which may be used to implement the method and system of the present invention. As shown, subscriber unit 24 includes antenna 100 coupled to transceiver 102. Transceiver 102 typically transmits and receives signals on a pair of frequencies selected by frequency select signal 104. Transceiver 102 is compatible with the modulation and demodulation scheme of the air interface of communications system 20.

Transceiver 102 communicates data and messages with message processor 106, controller 108, and channel processor 110. Message processor 106 receives and responds to messages primarily from message processor 42 in FIG. 1.

Controller 108 is responsible for the overall function of subscriber unit 24 and may be implemented with a programmable data processor. Controller 108 may also include memory 112 and resource selector 114.

Memory 112 may be used to store programs and data. Programs stored in memory 112 may be executed by controller 108. Data stored in memory 112 may store measurements, operating parameters, resource sensitivity indicators, and other parameters related to subscriber unit operation.

Resource selector 114 may be used to select resources in response to resource allocations by resource allocator 46 (see FIG. 1), or may alternatively be used to select system resources for testing or measurements.

Channel processor 110 is used to process and format either voice or data payloads. Channel processor 110 is coupled to interface 116, which may also include a speaker and a microphone, or a data port, to provide a way for the user to input and output data to and from subscriber unit 24.

Subscriber unit 24 may also include a system resource measurer, such as signal measurer 118 in transceiver 102, for measuring system resources in order to determine a resource sensitivity indicator.

Figure 3:
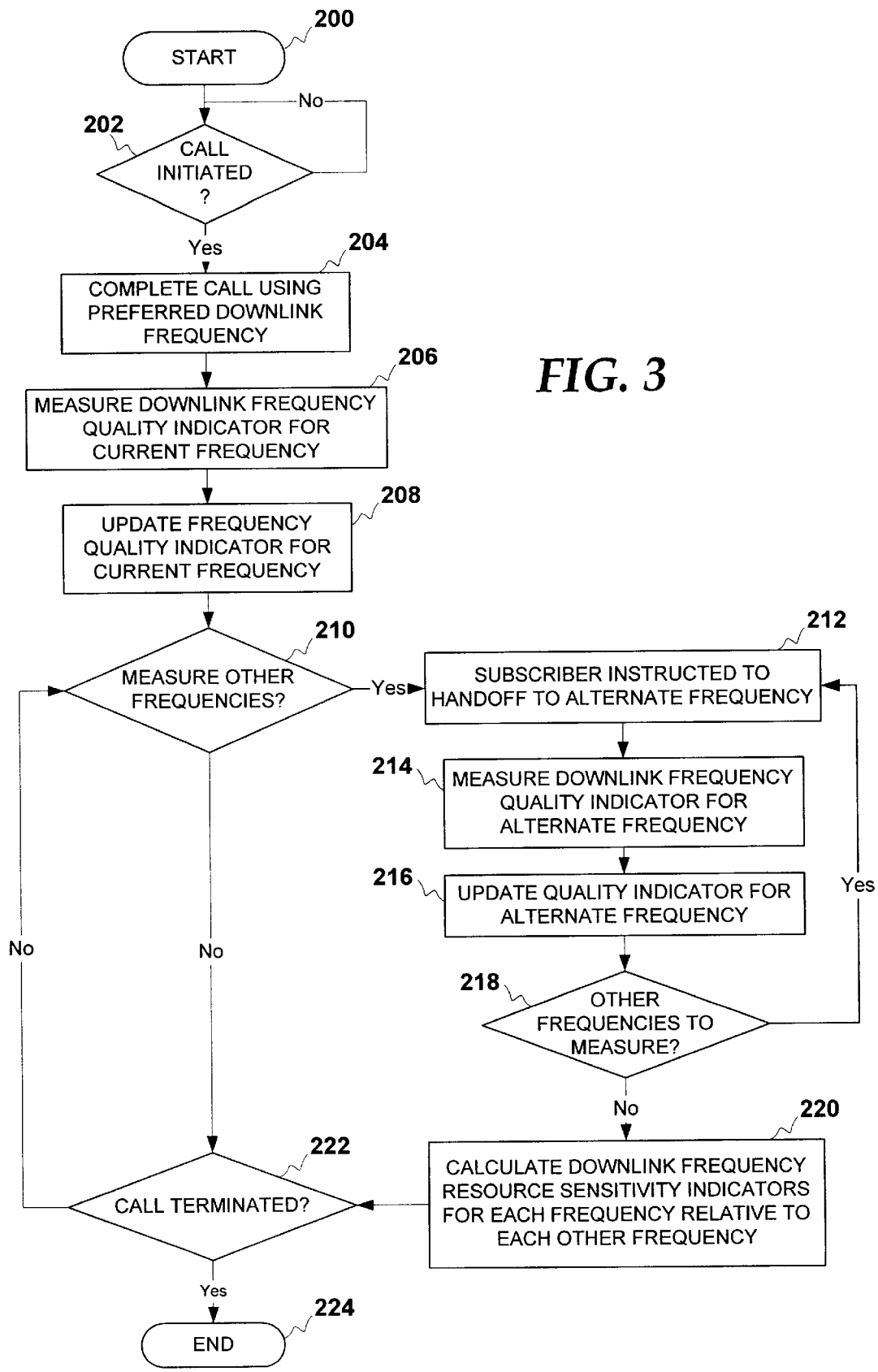
FIG. 3 depicts a high-level flowchart that illustrates the method of generating a resource sensitivity indicator in accordance with the method and system of the present invention.

With reference now to FIG. 3, there is depicted a high-level flowchart that illustrates the determination of a resource sensitivity indicator according to one embodiment of the method and operation of the present invention. As illustrated, the process begins at block 200 and thereafter passes to block 202 wherein the process determines whether or not a call has been initiated by the subscriber unit. If a call has not been initiated, the process iteratively loops to wait for a call initiation, as shown by the "No" branch from block 202.

If a call has been initiated, the process completes the call using a preferred downlink frequency, as depicted at block 204. Note that in this example, a downlink frequency is a system resource that is allocated to the subscriber unit by the wireless communications system. Therefore, the resource sensitivity indicator determined according to the example of this flowchart indicates the subscriber unit's sensitivity to a change from one frequency to another. As mentioned previously, many other resource sensitivity indicators may be determined in relation to many other system resources.

Next, the process measures a downlink frequency quality indicator for the current downlink frequency, as illustrated at block 206. This quality indicator may be measured by: determining the signal to noise ratio, $E_b/N_o$; by measuring a frame error rate; by measuring a signal power required to obtain a given quality; by measuring latency of data packets; or with other similar measurements. Preferably, the subscriber unit executes the measurement with a resource measurer, such as signal measurer 118 in subscriber unit 24 (see FIG. 2).

Once the frequency quality indicator has been determined, it is updated in memory, as depicted at block 208. The process of updating the frequency quality indicator may include averaging a number of measured frequency quality indicators over a period of time in order to produce a more statistically accurate sample. Alternatively, the quality indicator may be averaged over a number of calls or during the same call.

Next, the process determines whether it is time to measure alternative system resources, such as frequency quality indicators for other frequencies, as illustrated at block 210. Since the quality of reception of different frequencies changes as the environment changes, it is periodically necessary to measure other frequencies to detect and respond to such changes. If it is time to measure other frequencies, the subscriber is instructed to handoff to an alternate downlink frequency, as depicted at block 212. Handoff to an alternate downlink frequency is accomplished by sending the traffic channel data to a different power amplifier, such as power amplifiers 48–52 (see FIG. 1), under the control of control signal 56.

After changing frequencies, the process measures a downlink frequency quality indicator for the alternate frequency, as illustrated at block 214. Preferably, this measurement is made in the same way as the measurement in block 206. After measuring, the downlink frequency quality indicator is updated for the alternate frequency, as depicted at block 216. The process of updating the quality indicator is preferably similar to the process used in block 208.

Once the alternate frequency has been measured and updated, the process determines whether or not other frequencies should be measured, as illustrated at block 218. In a system that uses more than two downlink frequencies, all frequencies may have measured and updated downlink frequency quality indicators. If other frequencies need to be measured, the process iteratively returns to block 212, wherein the subscriber unit is instructed to handoff to a new alternate frequency.

Once all frequencies have been measured, the process passes from block 218 to block 220, wherein the process calculates downlink frequency resource sensitivity indicators for each frequency relative to each other frequency. For example, if a wireless communications system includes two frequencies, $F_1$ and $F_2$, two downlink frequency resource sensitivity indicators may be calculated wherein one indicator shows a positive 6 dB preference for frequency $F_1$ relative to frequency $F_2$, and the other sensitivity indicator shows a negative 6 dB sensitivity indicator for frequency $F_2$ relative to frequency $F_1$. Thus, the downlink frequency resource sensitivity indicators indicate a magnitude of a preference for frequency $F_1$ compared to frequency $F_2$. Positive indications may indicate a preference for the first frequency over the second frequency, and negative indicators may show a preference for the second frequency over the first frequency. Thus, the downlink frequency sensitivity indicator shows what effect a specified change in downlink frequency will have upon both the subscriber unit and the base station.

After the calculations of relative resource sensitivity indicators, the process determines whether or not the call is terminated, as illustrated at block 222. If the call is not terminated, the process iteratively returns to block 210 to determine whether or not it is time to measure other frequencies. If the call has terminated, the process of determining a resource sensitivity indicator ends, as depicted at block 224.

In FIG. 3, the system resource associated with the resource sensitivity indicator is a downlink frequency. Resource sensitivity indicators may be calculated for other system resources.

While the resource sensitivity indicator calculated in FIG. 3 is relative indicator showing a magnitude of a preference for one system resource over another system resource, another resource sensitivity indicator may not show a magnitude. Instead, it may only show that a subscriber does not want a particular system resource changed unless it is absolutely necessary.

For example, a subscriber that needs to transfer a high volume of data may indicate a resource sensitivity to a data rate, indicating that the subscriber's data rate should not be changed, or if it must be changed, it should be changed after all other compensating system resources have been changed first (e.g., power may be increased first to try to maintain a high data rate), or changed after changing data rates of subscribers that do not have a resource sensitivity to data rates. For example, if a subscriber wants to remain at a certain data rate, the subscriber may be willing to change to an alternate frequency, change signal power, or change a permitted latency before the data rate is lowered.

As shown in FIG. 3, the resource sensitivity indicator is determined as a result of measuring and comparing allocated resources. Other system resources that may also be determined by comparing measurements are: a quality of service system resource based upon frame error rate measurements; an average data rate system resource; and a transmit power system resource.

FIG. 3 also shows measuring and comparing during a call. In an alternative embodiment, the system may make test calls that do not involve the user in order to measure and compare system parameters to determine the resource sensitivity indicator.

Not all a resource sensitivity indicators are a result of measuring and comparing system parameters. Other methods of determining resource sensitivity indicators include inputting them directly into the communications system. For example, the subscriber can input a resource sensitivity by selecting a level of communications service offered by the communications system operator. If one subscriber pays a premium for service, she may be indicating a resource sensitivity indicator for a higher data rate or higher voice quality compared to users that are not paying a premium. Other users may indicate a resource sensitivity for longer battery life, wherein they are willing to reduce their data rate because their battery will last longer at the lower rate. These types of system resource sensitivities may be indicated and stored in a database, such as database 44, when the user subscribes to the communications service.

Figure 4:
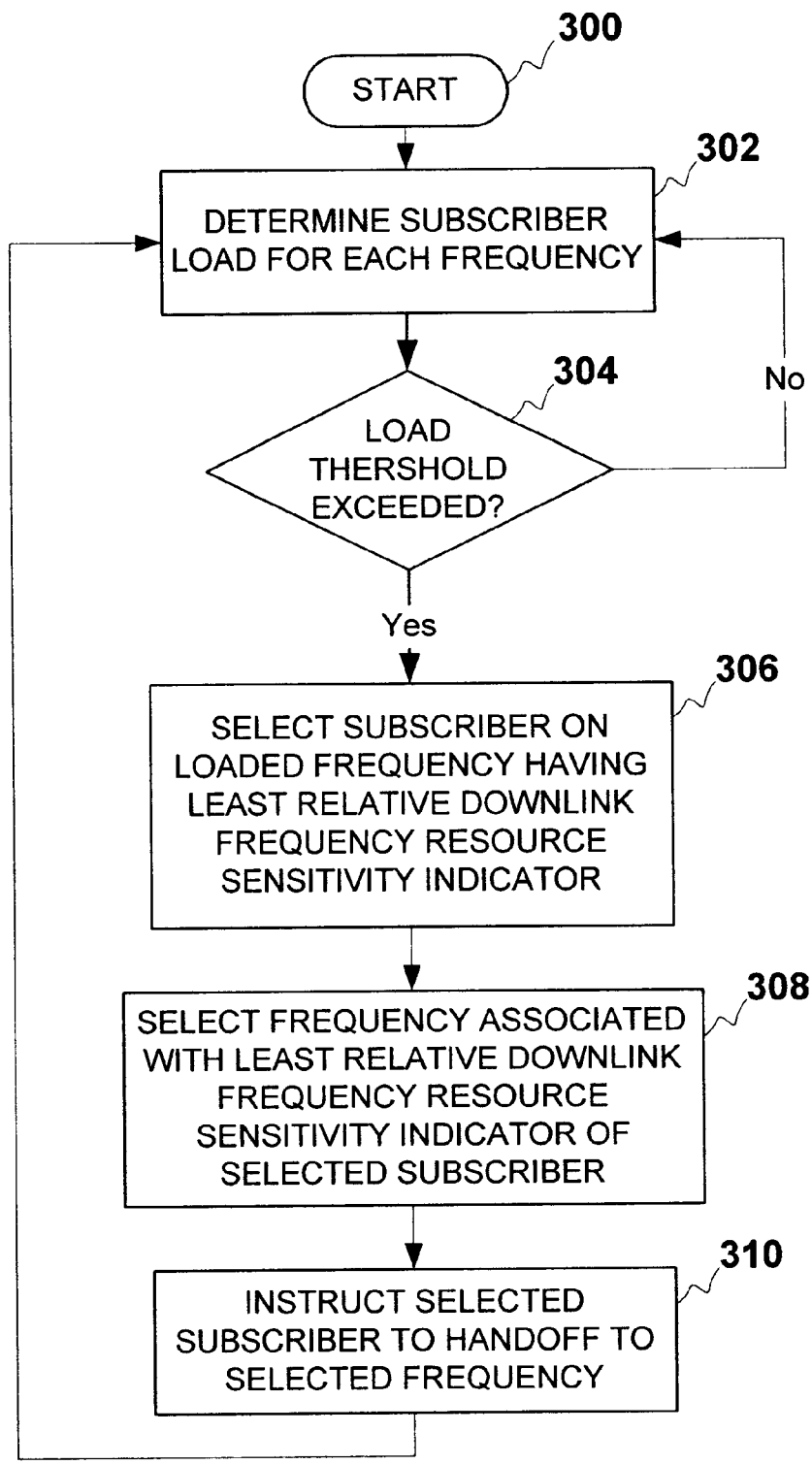
FIG. 4 is a high-level flowchart depicting the process of allocating system resources in response to resource sensitivity indicators of the subscriber units in accordance with the method and system of the present invention.

Referring now to FIG. 4, there is depicted a high-level flowchart that illustrates the allocation of system resources in response to resource sensitivity indicators of subscribers in accordance with the method and operation of the present invention. As illustrated, the process begins at block 300 and thereafter passes to block 302 wherein the process determines a subscriber load for a system resource, such as, in this example, each carrier frequency. The subscriber load on the frequency may be determined by measuring the percentage of available downlink power allocated in the base station, or the total number of spreading codes in use by subscribers. The "subscriber" load measured here is caused by allocation of system resources to subscriber units.

Next, the process determines whether or not a load threshold for the resource has been exceeded, as depicted at block 304. If the subscriber load threshold has not been exceeded, the process iteratively returns to block 302 wherein the subscriber load for each frequency is redetermined.

If the subscriber load threshold is exceeded, the process selects a subscriber using the loaded frequency that has the least relative downlink frequency resource sensitivity indicator, as illustrated at block 306. By selecting the subscriber with the least relative downlink frequency resource sensitivity indicator the process has selected the subscriber unit that will be negatively affected in the least amount when it is moved to another frequency.

For example, if two subscriber units are on heavily loaded frequency $F_1$, and the first subscriber unit has a resource sensitivity indicator of 1 dB preference of frequency $F_1$ over lightly loaded frequency $F_2$, and the second subscriber has a 6 dB preference of frequency $F_1$ over frequency $F_2$, the first subscriber unit is selected since it is affected by only 1 dB by the move from frequency $F_1$ to frequency $F_2$.

Next, the process selects the frequency associated with the least relative downlink frequency resource sensitivity indicator, as depicted at block 308. If, in the example above, the subscriber may operate on frequencies $F_1$, $F_2$, or $F_3$, each of the two alternate frequencies, $F_2$ and $F_3$, is associated with a resource sensitivity indicator relative to frequency $F_1$. The frequency associated with the least resource sensitivity indicator—the one indicating the smallest adverse impact of a specific change in frequency allocation—is selected at block 308.

Finally, the process instructs the selected subscriber unit to handoff to the selected frequency, as illustrated at block 310. Once the selected subscriber is handed off, the resource loading detected at block 304 will be alleviated.

In an alternate embodiment, the subscriber with the least resource sensitivity indicator may not be selected if it is determined that the resource loading may be reduced by a greater amount if another subscriber is selected. This alternate method of selection would still take into account the resource sensitivity indicator, and add another consideration-the amount of system resource saved by the change in allocation-to the subscriber selection process.

For example, a subscriber may not be adversely affected at all by a change in system resource allocation, and as a result of the change, the resource shortage may be alleviated by only a small amount. Some subscribers will not care if the resource allocation is changed, and their change will not produce a resource savings. Thus, selection of a subscriber to change may involve a balancing between the resource sensitivity indicator and the amount of resource shortage that may be alleviated.

Once the selected subscriber is handed off to the selected frequency, the process iteratively returns to block 302 wherein the subscriber load for each frequency is once again determined.

According to an important aspect of the present invention, the process detects a problem with the current allocation of system resources. In particular with reference to FIG. 4, the process has determined that a subscriber load on a particular frequency has exceeded a threshold. After detecting the problem with the system resource allocation, the process then selects a subscriber unit that will have its system resource allocation changed in order to alleviate the problem. This subscriber unit is selected based upon resource sensitivity indicators, which gives the communications system a way to choose a subscriber unit that will be least effected by the reallocation of a system resource. The resource sensitivity informs the system that particular resources are important to that subscriber, and in some instances the indicator may show a magnitude associated with that importance.

When allocating system resources, an examination of resource sensitivity indicators may show that a particular subscriber unit actual prefers to have an alternate allocation of a system resource. That is, a change in resource allocation will improve communication service, rather than have an adverse impact.

Other system resources that may be allocated in response to subscriber resource sensitivity indicators include: resources to support higher data rates, transmit power resources, backhaul resources for transporting data between the base station and the base station controller, spreading code resources, and the like.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for allocating a system resource to subscribers of a wireless communication system, the method comprising the steps of:

for each of a first subscriber and a second subscriber, determining a resource sensitivity indicator for a system resource allocated by the wireless communication system;

detecting an inefficient allocation of the system resource wherein an alternate allocation comes closer to fulfilling requests for allocation of a requested system resource than a present allocation; and changing an allocation of the system resource to the one of the first and second subscribers having a lower resource sensitivity indicator to increase the efficiency of system resource allocation.

2. The method for allocating a system resource of a wireless communication system according to claim 1 wherein the system resource includes a channel having a selected transmission frequency.

3. The method for allocating a system resource of a wireless communication system according to claim 1 wherein the system resource includes a data transmission rate.

4. The method for allocating a system resource of a wireless communication system according to claim 1 wherein the system resource includes a data transmission quality.

5. The method for allocating a system resource of a wireless communication system according to claim 1 wherein the step of determining a resource sensitivity indicator for a system resource allocated by the wireless communication system further includes determining a preference for a first system resource over a second system resource.

6. The method for allocating a system resource of a wireless communication system according to claim 5 wherein the step of determining a preference for a first system resource over a second system resource further includes determining a magnitude of a preference of a first system resource over a second system resource.

7. The method for allocating a system resource of a wireless communication system according to claim 5 wherein the step of determining a preference for a first system resource over a second system resource further includes determining a preference of a channel having a first transmission frequency over a channel having a second transmission frequency.

8. The method for allocating a system resource of a wireless communication system according to claim 1 wherein the step of changing an allocation of the system resource to the one of the first and second subscribers having a lower resource sensitivity indicator to increase the efficiency of system resource allocation further includes changing an allocation of a channel frequency to the one of the first and second subscribers having a lower frequency resource sensitivity indicator to increase the efficiency of the allocation of channel frequencies.

9. A system for allocating a system resource to subscribers of a wireless communication system comprising:
   means for determining a resource sensitivity indicator for a system resource allocated by the wireless communication system for each of a first subscriber unit and a second subscriber unit;
   means for detecting an inefficient allocation of the system resource wherein an alternate allocation comes closer to fulfilling requests for allocation of a requested system resource than a present allocation; and
   means for changing an allocation of the system resource to the one of the first and second subscriber units having a lower resource sensitivity indicator to increase the efficiency of system resource allocation.

10. The system for allocating a system resource of a wireless communication system according to claim 9 wherein the system resource includes a channel having a selected transmission frequency.

11. The system for allocating a system resource of a wireless communication system according to claim 9 wherein the system resource includes a data transmission rate.

12. The system for allocating a system resource of a wireless communication system according to claim 9 wherein the system resource includes a data transmission quality.

13. The system for allocating a system resource of a wireless communication system according to claim 9 wherein the means for determining a resource sensitivity indicator for a system resource allocated by the wireless communication system further includes means for determining a preference for a first system resource over a second system resource.

14. The system for allocating a system resource of a wireless communication system according to claim 13 wherein the means for determining a preference for a first system resource over a second system resource further includes means for determining a magnitude of a preference of a first system resource over a second system resource.

15. The system for allocating a system resource of a wireless communication system according to claim 13 wherein the means for determining a preference for a first system resource over a second system resource further includes means for determining a preference of a channel having a first transmission frequency over a channel having a second transmission frequency.

16. The system for allocating a system resource of a wireless communication system according to claim 9 wherein the means for changing an allocation of the system resource to the one of the first and second subscribers having a lower resource sensitivity indicator to increase the efficiency of system resource allocation further includes means for changing an allocation of a channel frequency to the one of the first and second subscribers having a lower frequency resource sensitivity indicator to increase the efficiency of the allocation of channel frequencies.

17. A method for allocating a system resource to subscribers of a wireless communication system, the method comprising the steps of:
   for each of a first subscriber unit and a second subscriber unit, determining a resource sensitivity indicator for a system resource allocated by the wireless communication system;
   detecting an inefficient allocation of the system resource wherein an alternate allocation comes closer to fulfilling requests for allocation of a requested system resource than a present allocation;
   selecting one of the first and second subscriber units in response to the resource sensitivity indicators of the first and second subscriber units, and in response to a potential increase in efficiency resulting in a change of system resource allocation; and
   changing an allocation of the system resource to selected subscriber unit to increase the efficiency of system resource allocation.

* * * * *